United States Patent [19]

Okamoto et al.

[11] Patent Number: 4,831,501
[45] Date of Patent: May 16, 1989

[54] REDUCED TEMPERATURE LAMP ASSEMBLY SUITABLE FOR USE AS A SUPPLEMENTAL HIGH MOUNTED STOP LAMP ON A MOTOR VEHICLE

[75] Inventors: Noboru Okamoto; Hiroshi Shida, both of Shimizu, Japan

[73] Assignee: Koito Seisakusho Co., Ltd., Tokyo, Japan

[21] Appl. No.: 209,327

[22] Filed: Jun. 20, 1988

[30] Foreign Application Priority Data

Oct. 23, 1987 [JP] Japan .................. 62-267381

[51] Int. Cl.[4] .............................. B60Q 1/44
[52] U.S. Cl. .................... 362/61; 362/294; 362/299; 362/300; 362/373; 362/80.1; 340/479
[58] Field of Search ............ 340/87, 97; 362/61, 362/80, 294, 296, 297, 298, 299, 300, 373

[56] References Cited

U.S. PATENT DOCUMENTS 4,575,782  3/1986  Levine et al. .............. 340/87
4,602,320  7/1986  Tomkin et al. ............. 362/61
4,626,967 12/1986  Segoshi ..................... 362/61
4,654,757  3/1987  Birkhauser ................. 362/61
4,724,515  2/1988  Matsuki et al. ............ 340/87
4,744,011  5/1988  Tomita et al. ............. 362/80

Primary Examiner—Ira S. Lazarus
Assistant Examiner—David G. Messer
Attorney, Agent, or Firm—Koda and Androlia

[57] ABSTRACT

A plastic lamp housing is molded in one piece with two cantilevers extending forwardly from its rear wall for supporting a metal made reflector and a light bulb out of direct contact with all the inside surfaces of the lamp housing. The reflector thermally covers at least the top and bottom and rear sides of the light source for the reduction of heat transmission to the lamp housing. Depending from the lamp housing, a lamp standard has a hollow extending therethrough in communication with the interior of the lamp housing through a heat release opening formed in the bottom of the lamp housing. The lamp standard is for use in mounting the lamp on a hollow structural part of a motor vehicle in the vicinity of its rear window. Therefore, by creasing an opening in the hollow vehicle part, the heated air within the lamp housing can be vented into the hollow lamp standard and thence into the hollow vehicle part, instead of into the interior of the vehicle body.

8 Claims, 5 Drawing Sheets

REDUCED TEMPERATURE LAMP ASSEMBLY SUITABLE FOR USE AS A SUPPLEMENTAL HIGH MOUNTED STOP LAMP ON A MOTOR VEHICLE

BACKGROUND OF THE INVENTION

Our invention relates to lighting devices and more particularly to a lamp assembly featuring provisions for dissipating the heat emitted by the light source incorporated therein. The lamp assembly in accordance with our invention finds a typical application as a supplemental high mounted stop lamp on a motor vehicle, although we do not wish our invention to be limited to this particular application.

The high mounted stop lamp or lamps are mounted high and, usually, just inwardly of the rear window of a vehicle for supplementing its rear mounted stop lamp system. The stop lamps give a steady warning light through an intervening vehicle or vehicles to operators of the following vehicles to indicate the intension of the vehicle operator to stop or diminish speed by braking. Being mounted interiorly of the vehicle body, the supplemental high mounted stop lamps should not emit too much heat because such heat can discomfort the operator and other rider or riders of the vehicle. The overheating of the lamp housing itself is also objectionable because its useful life will markedly decrease, particularly if it is molded of a plastic which is less heat resistant than metal.

As far as we are aware, however, there have been suggested or used no supplemental high mounted stop lamps that are designed to avoid the overheating of the lamp housing and to avoid the resulting radiation of heat into the interior of the vehicle body.

SUMMARY OF THE INVENTION

We have hereby invented how to minimize the transmission of heat from the light source to the lamp housing, and the consequent radiation of heat from the latter, in a lamp assembly of the type under consideration.

Briefly, our invention may be summarized as reduced temperature lamp assembly comprising a lamp housing of plastic material having a lens attached thereto. Within the lamp housing a light source and a metal made reflector are supported by support means such that both light source and reflector are held out of direct contact with the inside surfaces of the lamp housing. The reflector is so configured to effectively intervene between the light source and the lamp housing for minimal irradiation of the latter by the former. A heat release opening is formed in the lamp housing for venting the heated air therefrom.

Preferably, a hollow lamp standard is coupled to the lamp housing for use in mounting the lamp assembly in position. The hollow in the lamp standard communicates with the interior of the lamp housing via the heat release opening.

Thus, being largely shielded from the light source by the metal made reflector, the plastic lamp housing is not directly exposed to the heat of the light source. Heat transmission from the reflector to the lamp housing is also reduced to a minimum as the reflector is supported out of contact with the lamp housing. Additionally, the heated air within the lamp housing is vented through the heat release opening formed in the lamp housing and, possibly, through the hollow lamp standard communicating therewith.

In the use of the lamp assembly as supplemental high mounted stop lamp, the lamp standard can be mounted to a hollow structural part of the vehicle, with an opening formed in the structural part for communicating its interior with that of the lamp housing. The heat radiated by the light source will then be mostly dissipated by being guided into the hollow structural part of the vehicle, instead of into the interior of the car body. It will therefore be appreciated that the housing of the lamp assembly is not to be heated so much as to cause discomfort to the vehicle operator or other rider or riders, and the useful life of the lamp assembly itself will extend significantly.

The above and other features and advantages of our invention and the manner of realizing them will become more apparent and the invention itself will best be understood, from a study of the following description and appended claims, with reference to the attached drawings showing a preferred embodiment of the invention.

DESCRIPTION OF THE PREFERRED EMBODIMENT

Figure 1:
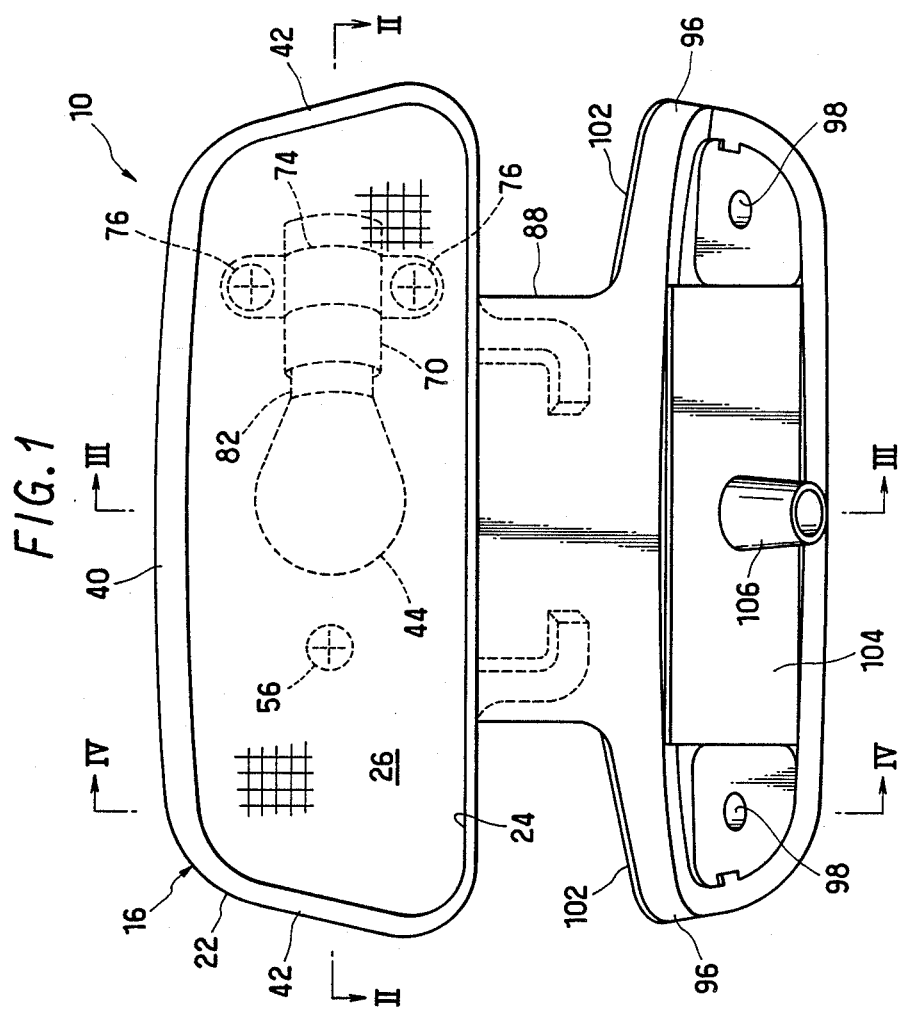
FIG. 1 is a front elevation of the supplemental high mounted stop lamp constructed in accordance with the novel concepts of our invention.
Figure 2:
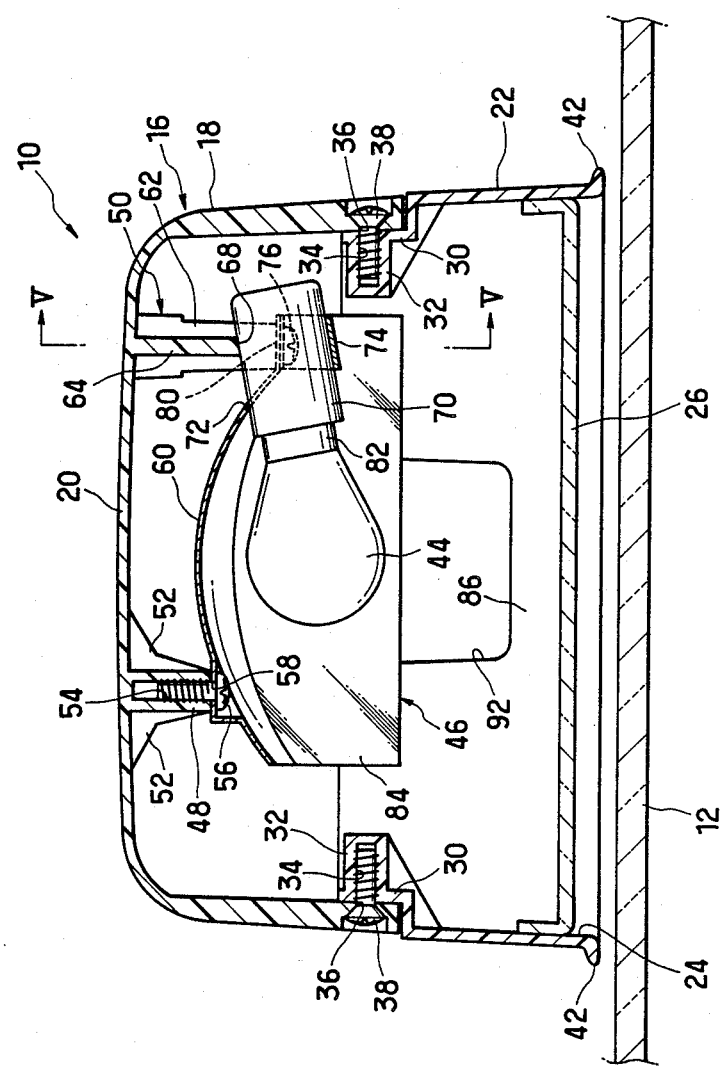
FIG. 2 is a horizontal section through the high mounted stop lamp of FIG. 1, taken along the line II—II therein and showing in particular the lamp housing together with the various parts contained therein.
Figure 3:
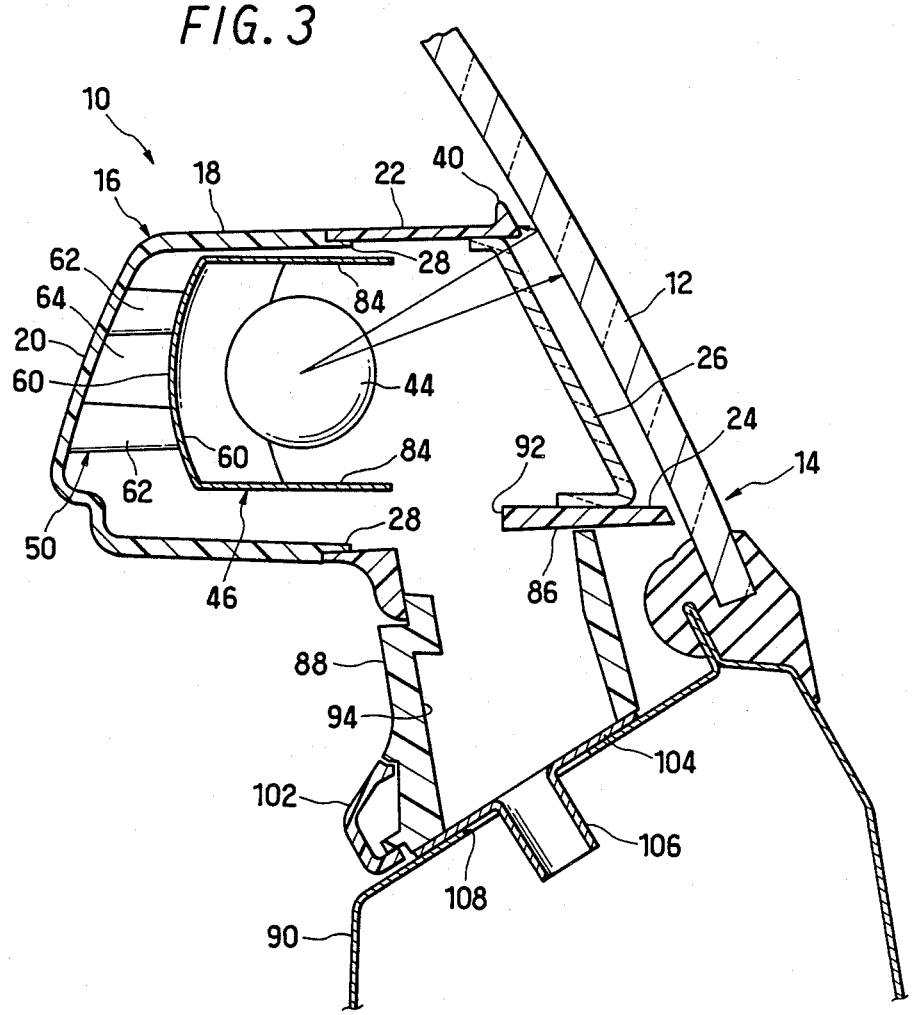
FIG. 3 is a vertical section through the high mounted stop lamp, taken along the line III'III in FIG. 1 and showing the lamp together with associated parts of the vehicle to which it is mounted.
Figure 4:
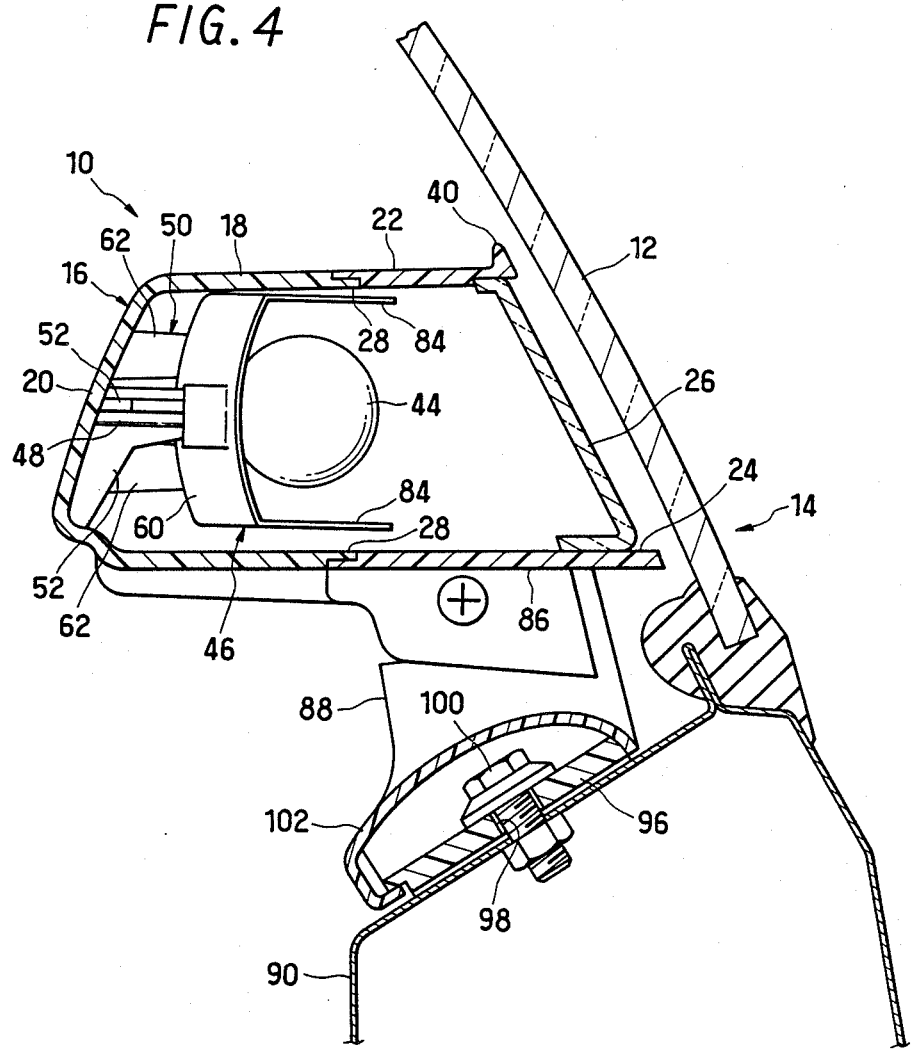
FIG. 4 is a view similar to FIG. 3 but taken along the line IV—IV in FIG. 1.

We will now describe in detail the reduced temperature lamp assembly of our invention as adapted for use as a supplemental high mounted stop lamp generally designated 10 in FIGS. 1-4. Of these, FIGS. 3 and 4 show the stop lamp assembly 10 mounted in position interiorly of the rear window 12 of a motor vehicle 14. The stop lamp assembly has a molded plastic lamp housing 16 generally in the shape of a box, opening forwardly of the lamp assembly 10, or rearwardly of the motor vehicle 14, and elongated horizontally as seen in a front view as in FIG. 1.

As will be noted from FIGS. 2-4, the lamp housing 16 is comprised of a major portion 18 including a rear wall 20, and a front portion 22 defining the front end opening 24 of the lamp housing and coupled endwise, in a manner set forth hereafter, to the major portion so as to form a forward extension thereof. The front end opening 24 is closed by a lends 26 which may be molded from a transparent plastic and which may be fused or bonded to the lamp housing 16. FIGS. 3 and 4 indicate that the top and bottom front edges of the major housing portion 18 have forward extensions 28 of relatively short extent and reduced thickness to fit into the rear end of the front housing portion 22.

As clearly seen in FIG. 2, the front housing portion 22 is formed to include a pair of L shaped flanges 30 turned inwardly and rearwardly from its rear side edges for engagement with the corresponding front edges of the major housing portion 18. The L shaped flanges 30 have a pair of bosses 32 located approximately centrally of their vertical or longitudinal dimension and extending toward each other. The bosses define blind holes 34 opening outwardly and aligned with countersunk holes 36 in the major housing portion 18. The major portion 18 and front portion 22 of the lamp housing 16 can be secured to each other as a pair of screws 38 are inserted in and through the countersunk holes 36 in the major portion 18 and threadedly engaged in the blind holes 34 in the front portion 22.

We have divided the lamp housing 16 into the major portion 18 and front portion 22 in this embodiment because the, by a simple change of the front housing portion 22 together with the lens 26, the stop lamp assembly 10 becomes adaptable for installation on a variety of motor vehicles of different body configurations. The rear windows of such different vehicles may be curved with various radii and inclined at various angles, and the stop lamps may be mounted at various distances from their rear windows. It would nevertheless be impractical to fabricate stop lamp housings of different shapes and sizes for all such different models of vehicles, since they would add considerably to the manufacturing costs of the stop lamp assemblies and also require an unnecessarily large storage space. The division of the lamp housing 16 into the major portion 18 and front portion 22 is an excellent solution to these problems. Only the front housing portion 22 may be modified in shape and size for adapting the stop lamp assembly 10 to various vehicle models. Being less than half in size in comparison with the complete lamp housing 16, its front portion 22 is much less expensive to manufacture and requires much less storage space.

FIGS. 1 and 3 show that the front upper edge of the lamp housing 16, or of its front portion 22, has a rim 40 turned upwardly therefrom. FIGS. 1 and 2 also indicate that the pair of front lateral edges of the lamp housing 16 have each a rim 42 turned laterally outwardly therefrom. The upper rim 40 is greater in width than the side rims 42. All these rims 40 and 42 are intended to intercept the light rays that have been reflected from the vehicle rear window 12.

Disposed within the lamp housing 16 is a light source shown as an electric bulb 44 and, behind it, a metal made reflector 46. In order to hold them out of direct contact with the inside surfaces of the lamp housing 16 we have employed first 48 and second 50 cantilevers which are formed on the rear wall 20 of the lamp housing 16 in horizontally spaced apart positions thereon and which extend forwardly therefrom. These cantilevers 48 and 50 can be molded in one piece with the major housing portion 18.

An inspection of FIGS. 2 and 4 reveal that the first cantilever 48 takes the form of a cylinder, complete with reinforcing ribs 52, defining a blind hole 54 opening forwardly. A screw 56 extends through a clearance hole 58 in a parabolic major portion 60 of the reflector 46 and is threadedly engaged in the hole 54 in the first cantilever 48.

Figure 5:
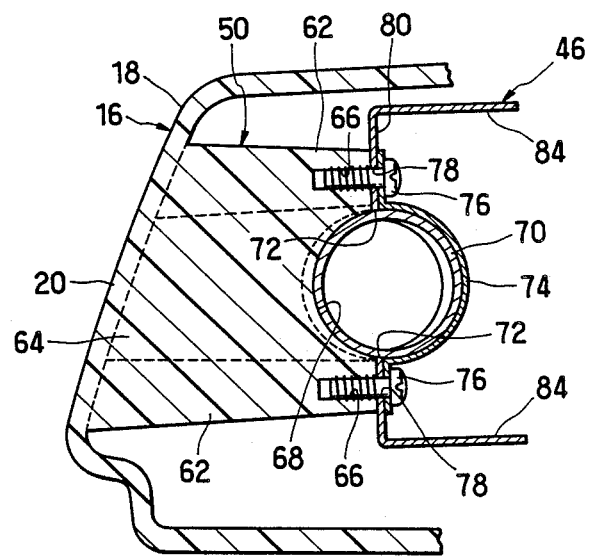
FIG. 5 is an enlarged, fragmentary vertical section through the high mounted stop lamp, taken along the line V-V in FIG. 2 and showing in particular the way in which the light and the reflector are mounted to one of the cantilevers formed in one piece with the lamp housing.

FIGS. 2, 3, and 5 illustrate that the second cantilever 50 is broader, or greater in vertical dimensions, than the first cantilever 48. Cross sectionally, the second cantilever 50 is I shaped, having a pair of relatively thick portions 62 at the top and bottom and a web portion 64 therebetween. The thick portions 62 of the second cantilever 50 have formed therein holes 66 opening forwardly. The web portion 64 has an approximately semicircular recess 68 cut in its front edge. As will be noted from FIG. 2, the edge of the web portion 64 defining the semicircular recess 68 rather gently slopes laterally forwardly from the right hand edge to the left hand edge. Engaged in this semicircular recess 68 is a lamp socket 70, which is further received in a semielliptic recess 72 in the reflector 46. The lamp socket 70 is retained in position by a clamp 74 with a pair of screws 76 which extend through clearance holes 78 in a flat lateral extension 80 of the reflector major portion 60 and which are threadedly engaged in the holes 66 in the second cantilever 50. Thus the clamp 74 with the screws 76 serves the dual purpose of clamping the lamp socket 70, and fastening the right hand end, as seen in FIG. 2, of the reflector 46, to the second cantilever 50.

So clamped, the lamp socket 70 is angled forwardly in a horizontal plane as it extends from the right hand end to the left hand end, as seen in FIG. 2, by reason of the relative positions of the recesses 68 and 72 in the second cantilever 50 and the reflector 46. The light bulb 44 has its base 82 removably engaged in the lamp socket 70 and is thereby positioned right in front of the reflector major portion 60. It will be appreciated that only three screws, or equivalent fastener elements, and one clamp is needed for mounting the light bulb 44 and reflector 46 in thermally isolated positions within the lamp housing 16.

The reflector 46 is formed to include at least a pair of forward extensions or flat shield portions 84 extending forwardly from the top and bottom ends of its major portion 60, as well as of its lateral extension 80, so as to intervene between the light bulb 44 and the top and bottom walls of the lamp housing 16. The forward extensions 84 of the reflector 46 should be sufficiently large in comparison with the size of the light bulb 44 to minimize heat transmission to the lamp housing 16 by radiation.

Depending from the bottom 86 of the lamp housing 16 is a hollow lamp standard 88, seen in FIGS. 1-4, of plastic material for use in mounting the lamp assembly 10 on a hollow structural part 90 of the vehicle 14 underlying its rear window 12. The lamp standard 88 is coupled to the front portion 22 of the lamp housing 16. A heat release opening 92 in the bottom of the front housing portion 22 is open to the hollow 94 in the lamp standard 88. The lamp standard 88 has a flange base 96 extending in the opposite lateral directions from its bottom end. The flange base 96 has formed therein a pair of clearance holes 98 for receiving bolts 100, FIG. 4, by which the stop lamp assembly 10 is mounted to the hollow structural part 90 of the vehicle 14. A base cover 102 is fitted over the flange base 96 so as to conceal the pair of mounting bolts 100.

Both FIGS. 1 and 3 show that the bottom end of the hollow lamp standard 88 is closed by a flat closure member 104 having a short tube 106 extending downwardly into the hollow structural part 90 through an opening 108 formed in the latter. The member 104 with the tube 106 could be omitted, however, all that is required that the lamp housing 16 be open to the interior of the vehicle part 90 via the lamp standard 88.

Such being the construction of the supplemental high mounted stop lamp assembly 10 in accordance with our invention, the heat radiated by the light bulb 44 toward the top, bottom, and rear wall of the lamp housing 16 is all intercepted by the metal made reflector 46 with its pair of forward extensions 84. Although the reflector 46 itself will be heated by the light bulb 44, the heat of the reflector will not be directly transmitted to the lamp housing 16 but only through the two cantilevers 48 and 50. As an additional advantage, the heated air within the lamp housing 16 will be vented into the larger space within the structural part 90 of the vehicle 14 through the opening 90 in the bottom of the lamp housing and the hollow 94 in the lamp standard 88. The bottom of the lamp standard 88 may be left unclosed by the closure member 104 for the most effective dissipation of the heated air.

Although we have shown and described the reduced temperature lamp assembly of our invention as embodied in a supplemental high mounted stop lamp for vehicular use, we do not wish our invention to be limited by the exact details of this embodiment. Various modifications and adaptations of our invention may be made within the scope of our invention.

What we claim is:

1. A reduced temperature lamp assembly for use as a supplemental high mounted stop lamp on a motor vehicle, among other applications, the lamp assembly comprising:

a lamp housing of plastic material having a lens attached thereto;
   there being a heat release opening defined in the lamp housing;
   support means within the lamp housing;
   a light source supported by the support means and thereby spaced from inside surfaces of the lamp housing;
   a metal made reflector also supported by the support means and thereby spaced from the inside surfaces of the lamp housing, the reflector thermally covering at least the top and bottom and rear sides of the light source for the reduction of heat transmitted to the lamp housing by radiation; and
   a lamp standard coupling to the lamp housing for use in mounting the lamp assembly to a desired object, the lamp standard having a hollow formed therein in direct communication with the interior of the lamp housing via the heat release opening;
   whereby the heat emitted by the light source is allowed to escape into the hollow lamp standard through the heat release opening.

2. The reduced temperature lamp assembly of claim 1 wherein the support means comprises a pair of cantilevers formed in one piece with the lamp housing.

3. The reduced temperature lamp assembly of claim 2 further comprising:
   (a) a fastener element for securing the reflector to one of the cantilevers; and
   (b) clamp means for clamping the light source to the other of the cantilevers via the reflector.

4. A reduced temperature supplemental high mounted stop lamp to be mounted to a hollow structural part of a motor vehicle, comprising:
   (a) a lamp housing of plastic material having an open front end and including a rear wall and a bottom;
   (b) a lens closing the front end of the lamp housing;
   (c) there being a heat release opening defined in the bottom of the lamp housing;
   (d) cantilevered support means extending forwardly from the rear wall of the lamp housing;
   (e) a light source supported by the cantilevered support means and thereby spaced from inside surfaces of the lamp housing;
   (f) a metal made reflector disposed behind the light source for reflecting light therefrom forwardly of the lamp housing and also supported by the cantilevered support means in a position spaced from the inside surfaces of the lamp housing, the reflector being formed to include at least a pair of forward extensions for shielding the lamp housing from the heat radiated by the light source; and
   (g) a lamp standard depending from the bottom of the lamp housing and having formed therein a hollow in direct communication with the interior of the lamp housing the heat release opening, the lamp standard being for use in mounting the lamp on the hollow structural part of the motor vehicle;
   (h) whereby the heat emitted by the light source can escape from the interior of the lamp housing into the hollow lamp standard through the heat release opening and thence into the hollow structural part of the vehicle through an opening created in the latter, with minimal heat transmission to the lamp housing.

5. The reduced temperature supplemental high mounted stop lamp of claim 4 wherein the cantilevered support means comprises:
   (a) a first cantilever formed in one piece with the lamp housing for having the reflector secured thereto;
   (b) a second cantilever formed in one piece with the lamp housing and spaced from the first cantilever; and
   (c) clamp means for clamping the light source to the second cantilever, the clamp means being also effective to secure the reflector to the second cantilever.

6. The reduced temperature supplemental high mounted stop lamp of claim 5 wherein the light source comprises a lamp socket clamped by the clamp means to the second cantilever, and a light bulb removably engaged in the lamp socket.

7. The reduced temperature supplemental high mounted stop lamp of claim 4 wherein the lamp housing has a rim formed on its front end.

8. The reduced temperature supplemental high mounted stop lamp of claim 4 wherein the lamp housing comprises a major portion including the rear wall and opening forwardly, and a front portion having the lens attached thereto and coupled to the major portion so as to form a forward extension thereof.

* * * * *